T. GARRISON.
POULTRY FEEDER.
APPLICATION FILED DEC. 28, 1911.
1,026,859.
Patented May 21, 1912.
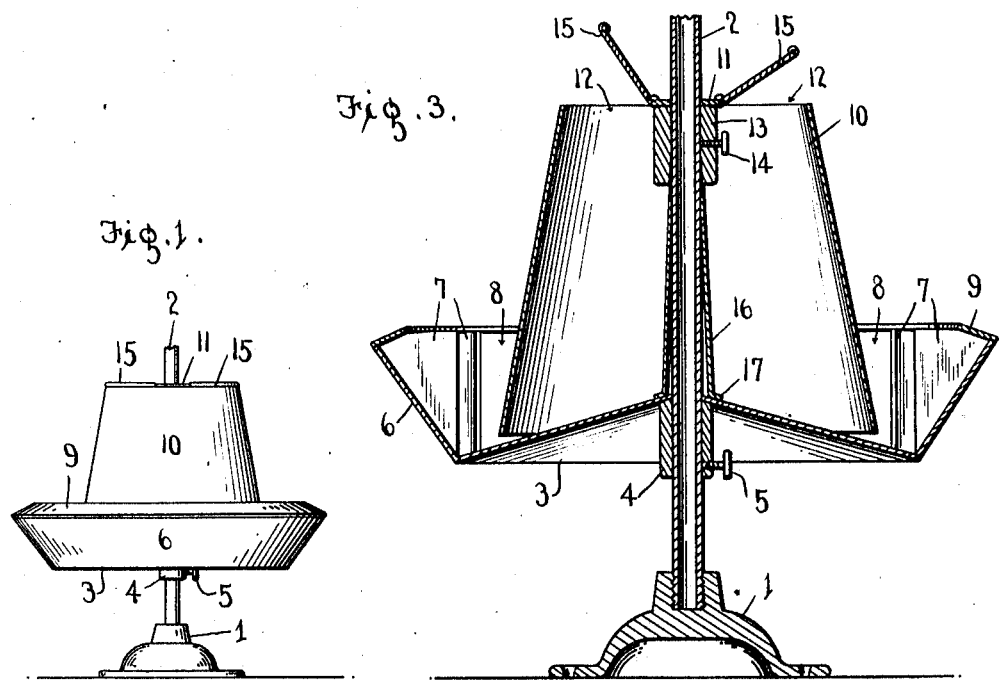
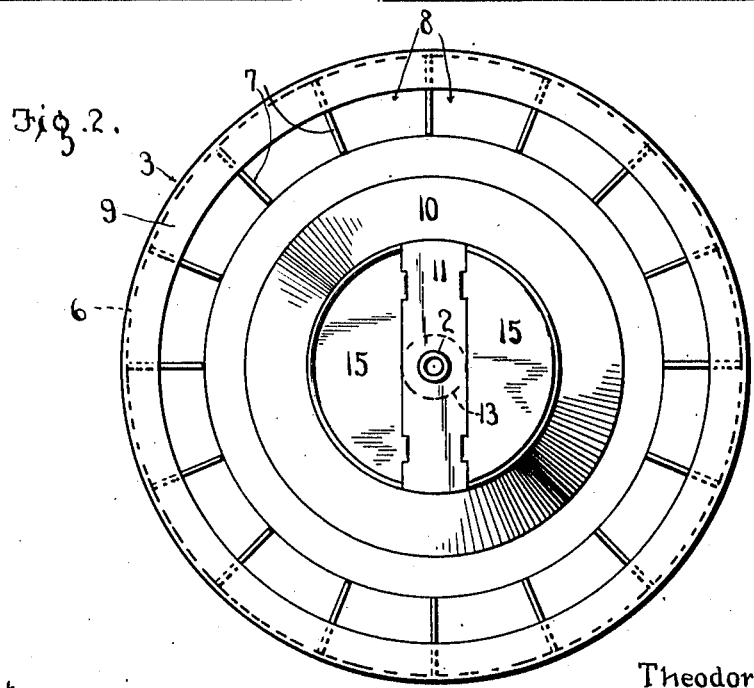
Witnesses
L. B. James
C. E. Hunt
Inventor
Theodore Garrison
by H. B. Willson & Co
Attorneys

UNITED STATES PATENT OFFICE.

THEODORE GARRISON, OF HAZLETON, PENNSYLVANIA.

POULTRY-FEEDER.

1,026,859.

Specification of Letters Patent. Patented May 21, 1912.

Application filed December 28, 1911. Serial No. 668,273.

*To all whom it may concern:*

Be it known that I, THEODORE GARRISON, a citizen of the United States, residing at Hazleton, in the county of Luzerne and State of Pennsylvania, have invented certain new and useful Improvements in Poultry-Feeders; and I do declare the following to be a full, clear, and exact description of the invention, such as will enable others skilled in the art to which it appertains to make and use the same.

This invention relates to improvements in poultry feeders.

One object of the invention is to provide a poultry feeder having an improved construction and arrangement of hopper and an improved feeding trough into which the feed is automatically discharged from the hopper and from which the fowls may feed without crowding.

Another object of the invention is to provide a poultry feeding device having means whereby the feed is prevented from being thrown or scattered out of the feeder by the fowls and whereby the latter are prevented from getting into the feeder.

With these and other objects in view the invention consists of certain novel features of construction, and the combination and arrangement of parts as will be more fully described and claimed.

In the accompanying drawings; Figure 1 is a side view of my improved feeder; Fig. 2 is a top plan view; and, Fig. 3 is a central vertical sectional view of the same.

My improved feeder comprises a base or supporting member 1 which is preferably constructed as shown and to which is secured a vertically disposed supporting post or standard 2. Adjustably secured to the supporting post 2 is a feed pan 3 which is preferably of circular form and has its bottom of conical form being inclined from the center downward toward the outer edges thereof as shown. In the center of the bottom is an opening through which the post or standard 2 passes, said opening being of such size as to form a close sliding engagement with the post. The pan 3 is adjustably supported on the post or standard 2 by a sleeve or collar 4 which is secured to the shaft at the desired elevation by a set screw 5.

The sides 6 of the pan preferably incline or flare outwardly from the bottom of the pan and secured to the inner surface of the sides 6 and projecting inwardly a suitable distance are a series of radially disposed partitions 7 which provide a plurality of feeding spaces 8 all around the edge of the pan. Secured to the upper ends of the partitions 7 and the upper edge of the sides 6 is an annular inwardly projecting flange 9 of sufficient width to prevent the food from being thrown or scattered out of the pan by the fowls feeding therefrom, said flange is not, however of such width as to prevent the fowls from readily reaching the food in the feed spaces 8 of the pan.

Adjustably secured to the upper portion of the post or standard 2 is a feed hopper 10 which is preferably of frusto-conical shape and has its sides inclined downwardly and outwardly and its lower end projecting into the pan 3 and terminating a short distance above the bottom of the pan whereby the food in the hopper will discharge therefrom through the space between the lower edge of the hopper and the bottom of the pan as the food is removed by the fowls from the feeding spaces 8 as will be readily understood. The upper end of the hopper is provided with a transverse centrally disposed supporting plate 11 having therein a centrally disposed passage 12 through which the upper end of the post or standard 2 projects. The hopper 10 is adjustably supported on the post 2 by a supporting sleeve or collar 13 which is secured to the post by a set screw 14.

Hinged at their inner edges to the opposite edges of the plate 11 are cover plates or doors 15 which are adapted to normally close the upper end of the hopper and which are provided to permit the hopper to be supplied with food. In order to prevent the food in the hopper and pan from working through the standard opening in the bottom of the pan and between the standard and the collar 4, I provide a sleeve or casing 16 which is engaged with the post within the hopper and has its lower edge turned outwardly to form a guard flange 17 which projects over the central portion of the bottom of the pan and around the opening therein and thus effectually prevents any food from working through said opening. The upper end of the sleeve or casing 16 closely fits the upper portion of the post or standard and if desired may be inserted in the lower end of the sleeve or collar 13 which supports the hopper.

A feed hopper constructed in accordance with my invention may be supported at any desired elevation and will permit a supply of food to be kept before the fowls at all times without danger of the feed becoming scattered or soiled by the fowls and in which the food is not apt to be taken by rats or mice.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A poultry feeder comprising a base, a supporting standard secured therein, a feed pan arranged on said standard, said pan having its bottom inclined from its center toward the outer sides thereof and having its sides flared outwardly, a pan supporting collar arranged on said post, a set screw to hold said collar in its adjusted positions on the post, a series of radially disposed partitions secured to the inner surface of the sides of the pan to provide a plurality of feed spaces, a guard flange secured to the upper edge of the sides of the pan and the upper ends of the partitions whereby the food is prevented from being scattered by the fowls feeding from the pan, a frusto-conical shaped hopper arranged on the post and having its lower end operatively engaged with the pan whereby the food in the hopper is automatically discharged into the feeding spaces of the pan, a hopper supporting collar arranged on said post, a set screw to hold said collar and hopper in their adjusted positions and cover plates to open and close the upper end of the hopper.

In testimony whereof I have hereunto set my hand in presence of two subscribing witnesses.

THEODORE GARRISON.

Witnesses:
  JOHN WILHELM,
  MARTIN B. GORMLEY.